United States Patent
Mohanty et al.

(10) Patent No.: US 11,776,006 B2
(45) Date of Patent: Oct. 3, 2023

(54) SURVEY GENERATION FRAMEWORK

(71) Applicant: Dell Products L.P., Round Rock, TX (US)

(72) Inventors: Bijan Kumar Mohanty, Austin, TX (US); Hung Dinh, Austin, TX (US); Divya Maddi, Austin, TX (US); Cleber Souza, Porto Alegre (BR)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/475,782

(22) Filed: Sep. 15, 2021

(65) Prior Publication Data

US 2023/0085559 A1 Mar. 16, 2023

(51) Int. Cl.
G06Q 30/00 (2023.01)
G06Q 30/0242 (2023.01)
G06N 3/04 (2023.01)
G06Q 10/063 (2023.01)

(52) U.S. Cl.
CPC .......... *G06Q 30/0245* (2013.01); *G06N 3/04* (2013.01); *G06Q 10/063* (2013.01)

(58) Field of Classification Search
None
See application file for complete search history.

(56) References Cited

U.S. PATENT DOCUMENTS

| | | | | |
|---|---|---|---|---|
| 11,295,347 | B1* | 4/2022 | Peng | G06N 3/08 |
| 2016/0034953 | A1* | 2/2016 | Wall | G06Q 10/107 |
| | | | | 705/14.53 |
| 2017/0293853 | A1* | 10/2017 | Chander | G06F 3/0481 |
| 2020/0228624 | A1* | 7/2020 | Burningham | G06Q 30/02 |

OTHER PUBLICATIONS

Feature extraction for machine learning and deep learning, Jun. 17, 2021, www.mathworks.com, printed through www.archive.org (Year: 2021).*
Agrawal et al published article "How to win with machine learning", Sep. 2020, Harvard Business Review (Year: 2020).*
Jason Brownlee published article 14 different types of learning in machine learning, Nov. 11, 2019 (Year: 2019).*
Hvitfeldt et al, Chapter 8—Dense Neural Network (published book Supervised machine learning for text analysis in R, 2021, printed through www.archive.org (Year: 2021).*
Amol Joby, What is training data? How it's used in machine learning, Jul. 30, 2021, Learn.g2.com (Year: 2021).*

* cited by examiner

*Primary Examiner* — Naresh Vig
(74) *Attorney, Agent, or Firm* — DALY, CROWLEY MOFFORD & DURKEE, LLP

(57) ABSTRACT

In one aspect, an example methodology implementing the disclosed techniques includes, by a survey workflow module, receiving a survey request event for which a survey is requested and generating a first feature vector for the survey request event, wherein the first feature vector comprises features extracted from the survey request event. The method also includes predicting, by a first trained prediction module, whether the survey request event will result in a survey based on the first feature vector, wherein the first trained prediction module is trained using a training dataset generated from a corpus of historical survey request event-survey data.

15 Claims, 10 Drawing Sheets

| | Event Source 202 | Event Type 204 | Event Status 206 | Internal/ External 208 | Destination 210 | Location 212 | Language 214 | Mode 216 | ... | Survey Requested 216 |
|---|---|---|---|---|---|---|---|---|---|---|
| 220 | Sales | Booking | Complete | External | John Doe | Austin, Texas | English | Email | | 1 (yes) |
| 222 | Support | Work Order | Complete | External | Unisys | Paris, France | French | Phone | | 0 (no) |
| 224 | Support | Case | Complete | External | Amy Jones | Seattle, Washington | English | Chat | | 1 (yes) |
| 226 | ITSM | Incident | Closure | Internal | Bijan Mohanty | Austin, Texas | English | Email | | 0 (no) |

Features (Independent Variable) — Target Data

| | Features (Independent Variable) | | | | | | | Target Data |
|---|---|---|---|---|---|---|---|---|
| Request Source (302) | Request Type (304) | Internal/ External (306) | Destination (308) | Location (310) | Language (312) | Question ID (314) | Mode (316) | ... | Response Received (318) |
| Sales | Booking | External | John Doe | Austin, Texas | English | 17 | Email | | 1 (yes) |
| Support | Work Order | External | Unisys | Paris, France | French | 123 | Phone | | 0 (no) |
| Support | Case | External | Amy Jones | Seattle, Washington | English | 43 | Chat | | 0 (no) |
| Service | Project | External | Bank of Acme | Charlotte, North Carolina | English | 267 | Mail | | 1 (yes) |

|   | 402 | 404 | 406 | 408 | 410 | 412 | 414 | 416 | 418 |
|---|---|---|---|---|---|---|---|---|---|
|   | Request Source | Request Type | Internal/ External | Destination | Location | Language | Question ID | Mode | Score Received |
| 420 | Sales | Booking | External | John Doe | Austin, Texas | English | 17 | Email | 4 |
| 422 | Support | Work Order | External | Unisys | Paris, France | French | 123 | Phone | 1 |
| 424 | Support | Case | External | Amy Jones | Seattle, Washington | English | 43 | Chat | 3 |
| 426 | Service | Project | External | Bank of Acme | Charlotte, North Carolina | English | 267 | Mail | 5 |

Features (Independent Variable) — Target Data

SURVEY GENERATION FRAMEWORK

BACKGROUND

Enterprises often use surveys to obtain feedback from their customers and partner organizations. For example, an enterprise may use the survey responses to gauge the satisfaction of its customers and partner organizations. The survey responses can also allow an enterprise to gain a better understanding of the adoption of their products and/or services as well as the customers' and partner organizations' levels of satisfaction in dealing with the enterprise. This understanding may play an important role in the planning of new products/services and the updating of existing products/services. As a result, enterprises can commit vast amounts of time, effort, and money in generating surveys and collecting, processing, and analyzing survey responses.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

In accordance with one illustrative embodiment provided to illustrate the broader concepts, systems, and techniques described herein, a computer implemented method to predict whether a survey request event will result in a survey includes, by a survey workflow module, receiving a survey request event for which a survey is requested and generating a first feature vector for the survey request event, wherein the first feature vector comprises features extracted from the survey request event. The method also includes predicting, by a first trained prediction module, whether the survey request event will result in a survey based on the first feature vector, wherein the first trained prediction module is trained using a training dataset generated from a corpus of historical survey request event-survey data.

In some embodiments, the first trained prediction module includes a dense neural network (DNN).

In some embodiments, the method further includes, responsive to a prediction that the survey request event will not result in a survey, not generating, by the survey workflow module, a survey for the survey request event.

In some embodiments, the method further includes, responsive to a prediction that the survey request event will result in a survey, generating, by the survey workflow module, a survey for the survey request event.

In some embodiments, the method further includes generating, by the survey workflow module, a second feature vector for the generated survey, wherein the second feature vector comprises features extracted from the generated survey, and predicting, by a second trained prediction module, whether the generated survey will result in a survey response based on the second feature vector, wherein the second trained prediction module is trained using a training dataset generated from a corpus of historical survey and survey response data.

In some embodiments, the second trained prediction module includes a classification model.

In some embodiments, the method also includes generating, by the survey workflow module, a third feature vector for the generated survey, wherein the third feature vector comprises features extracted from the generated survey, and predicting, by a third trained prediction module, an estimated score for the generated survey based on the third feature vector, wherein the third trained prediction module is trained using a training dataset generated from a corpus of historical survey and survey response score data.

In some embodiments, the third trained prediction module includes a regression model.

According to another illustrative embodiment provided to illustrate the broader concepts described herein, a system includes one or more non-transitory machine-readable mediums configured to store instructions and one or more processors configured to execute the instructions stored on the one or more non-transitory machine-readable mediums. Execution of the instructions causes the one or more processors to receive a survey request event for which a survey is requested and generate a first feature vector for the survey request event, wherein the first feature vector comprises features extracted from the survey request event. Execution of the instructions also causes the one or more processors to predict, using a first trained prediction module, whether the survey request event will result in a survey based on the first feature vector, wherein the first trained prediction module is trained using a training dataset generated from a corpus of historical survey request event-survey data.

In some embodiments, the first trained prediction module includes a dense neural network (DNN).

In some embodiments, execution of the instructions further causes the one or more processors to, responsive to a prediction that the survey request event will not result in a survey, not generate a survey for the survey request event.

In some embodiments, execution of the instructions further causes the one or more processors to, responsive to a prediction that the survey request event will result in a survey, generate a survey for the survey request event.

In some embodiments, execution of the instructions further causes the one or more processors to generate a second feature vector for the generated survey, wherein the second feature vector comprises features extracted from the generated survey, and predict, using a second trained prediction module, whether the generated survey will result in a survey response based on the second feature vector, wherein the second trained prediction module is trained using a training dataset generated from a corpus of historical survey and survey response data.

In some embodiments, the second trained prediction module includes a classification model.

In some embodiments, execution of the instructions further causes the one or more processors to generate a third feature vector for the generated survey, wherein the third feature vector comprises features extracted from the generated survey, and predict, using a third trained prediction module, an estimated score for the generated survey based on the third feature vector, wherein the third trained prediction module is trained using a training dataset generated from a corpus of historical survey and survey response score data.

In some embodiments, the third trained prediction module includes a regression model.

According to another illustrative embodiment provided to illustrate the broader concepts described herein, a non-transitory, computer-readable storage medium has encoded thereon instructions that, when executed by one or more processors, causes a process to be carried out. The process includes receiving a survey request event for which a survey is requested and generating a first feature vector for the survey request event, wherein the first feature vector comprises features extracted from the survey request event. The process also includes predicting, using a first trained prediction module, whether the survey request event will result in a survey based on the first feature vector, wherein the first trained prediction module is trained using a training dataset generated from a corpus of historical survey request event-survey data.

In some embodiments, the process further includes, responsive to a prediction that the survey request event will result in a survey, generating a survey for the survey request event.

In some embodiments, the process also includes generating a second feature vector for the generated survey, wherein the second feature vector comprises features extracted from the generated survey, and predicting, using a second trained prediction module, whether the generated survey will result in a survey response based on the second feature vector, wherein the second trained prediction module is trained using a training dataset generated from a corpus of historical survey and survey response data.

In some embodiments, the process also includes generating a third feature vector for the generated survey, wherein the third feature vector comprises features extracted from the generated survey, and predicting, using a third trained prediction module, an estimated score for the generated survey based on the third feature vector, wherein the third trained prediction module is trained using a training dataset generated from a corpus of historical survey and survey response score data.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

FIG. 2 is a diagram showing an illustrative data structure that represents a training dataset for training a learning model to predict whether a survey request event will result in a survey, in accordance with an embodiment of the present disclosure.

FIG. 3 is a diagram showing an illustrative data structure that represents a training dataset for training a learning model to predict whether a survey will result in a survey response, in accordance with an embodiment of the present disclosure.

FIG. 4 is a diagram showing an illustrative data structure that represents a training dataset for training a learning model to predict an estimated score for a survey, in accordance with an embodiment of the present disclosure.

DETAILED DESCRIPTION

Figure 1:
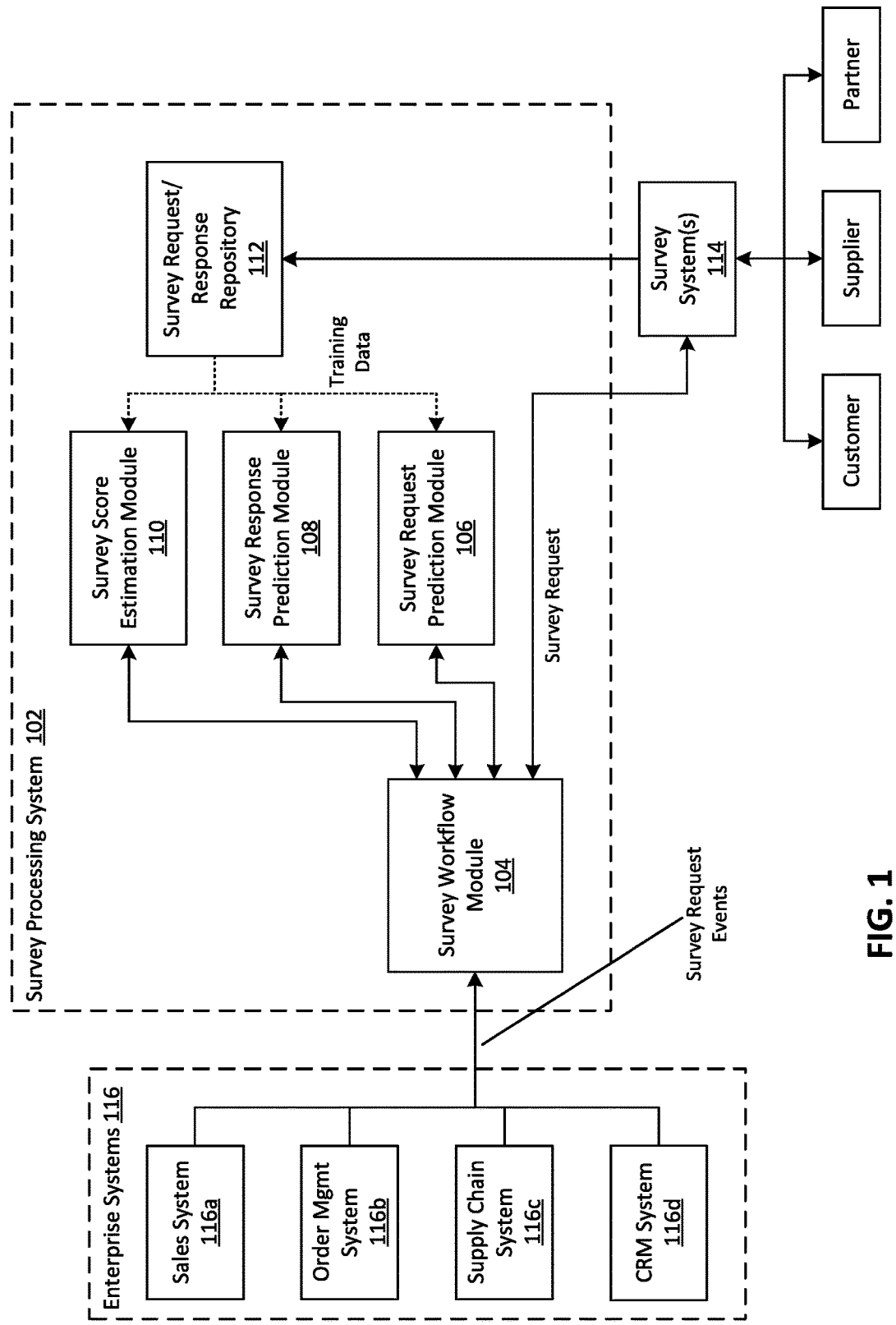
FIG. 1 is a diagram of an illustrative system architecture including a product recommendation system, in accordance with an embodiment of the present disclosure.

Surveys are often used by enterprises to obtain feedback regarding their products, services, and digital experiences (e.g., interactions between customers, partner organizations, and/or employees and an enterprise made possible by digital technologies). As used herein, the term "customer" may refer to a current customer, a past customer, a potential customer, or an individual (e.g., a person) or entity that the enterprise desires to acquire as a customer. Information obtained via responses to the surveys (i.e., survey responses) may be key in enabling enterprises to improve product/service quality, improve customer service, improve partner relations, lower costs, and attain higher profits, among others. To this end, enterprises may use surveys at various touchpoints in the customer journey (e.g., the process by which a customer interacts with an enterprise). For example, at various points in a customer's purchasing journey, an enterprise can send a survey to the customer soliciting feedback on a variety of topics, such as the enterprise's operational metrics. As another example, after the purchased product/service is delivered, an enterprise can send a survey to the customer soliciting feedback regarding the customer's overall purchasing experience. However, surveys present a challenge in that the survey recipients (e.g., customers, partner organizations, employees, etc.) may be uninterested in responding to the surveys for various reasons. Surveys sent to such uninterested survey respondents often fail to generate survey responses, which result in low survey response rates. Moreover, even in instances where an uninterested survey respondent does choose to provide feedback, the uninterested survey respondent may provide unreliable information in the survey response.

As a result of low survey response rates, enterprises often rely on heuristic-based rules to determine whether to send out a survey. For example, an enterprise may generate a survey request event requesting that a survey be sent to a survey respondent (e.g., a customer) at various points of engagement with a customer (i.e., customer touchpoints). These survey request events may, for instance, be generated by the various enterprise systems (e.g., sales systems, customer relationship management (CRM) systems, enterprise resource planning (ERP) systems, order management systems (OMSs), supply chain management (SCM) systems, and information technology service management (ITSM) systems, among others) used by the different enterprise units such as, for example, the enterprise's sales unit, the enterprise's marketing unit, the enterprise's manufacturing unit, the enterprise's customer service unit, and/or the enterprise's customer service unit. In response to a survey request event, the enterprise can apply a set of heuristic-based rules to determine whether the survey request event warrants a survey to be sent to a survey respondent. In other words, not all survey request events may result in surveys and the enterprise can apply the heuristic-based rules to determine whether a survey should be generated for a survey request event. These heuristic-based rules typically include inclusion, exclusion, prioritization, sampling, and other complex logic that are based on a variety of factors such as who is generating the survey request event, the type of product/service, the region in which the survey is to be generated, and the survey respondent, among others. Use of such complex heuristic-based rules allows the enterprise to control the number of surveys that are sent and to generate surveys that the enterprise believes have a higher chance of receiving survey responses. However, these complex heuristic-based rules are expensive to maintain, manage, and apply. Moreover, although these rules are based on numerous factors, the rules may still fail to consider other factors which may be more relevant in generating survey responses since the enterprise may lack insight regarding such factors.

It is appreciated herein that data regarding historical survey request events, generated surveys, and survey responses are very good indicators for accurately predicting whether a survey request event will result in a survey, whether a survey will result in a survey response, and an estimated score (e.g., survey score) for a survey response. Thus, certain embodiments of the concepts, techniques, and structures disclosed herein are directed to predicting whether to generate a survey for a survey request event based on historical survey request event and generated survey data (sometimes referred to herein more simply as "survey request event-survey data"). In some embodiments, a learning model (e.g., a regression-based deep learning model) may be trained using machine learning techniques (including neural networks) to predict whether a survey request event will result in the generation of a survey. The trained model can then be used to provide a survey generation framework that is insightful and efficient in the surveys that are actually generated in response to the survey request events. For example, to train such a model, historical survey request event-survey data (e.g., information regarding past survey request events and generated surveys) can be collected. Once this data is collected, the variables or parameters (also called features) that are correlated to or influence (or contribute to) the prediction of whether a survey request event results in a survey, or does not result in a survey, can be determined (e.g., identified) from the corpus of historical survey request event-survey data. These relevant features can then be used to generate a dataset (e.g., a training dataset) that can be used to train the model. A feature (also known as an independent variable in machine learning) is an attribute that is useful or meaningful to the problem that is being modeled (e.g., predicting whether a survey request event will result in a survey). Once trained using the training dataset, the trained model can be used to predict, provided information (e.g., features) regarding a survey request event, whether the survey request event will result in a survey. Being able to accurately predict whether a survey request event will result in a survey allows enterprises to generate surveys for the survey request events that warrant surveys and to not generate surveys for survey request events that do not warrant surveys.

According to some embodiments disclosed herein, the survey generation framework may include a trained machine learning model that can be used to predict whether a survey will result in a survey response. To this end, in some embodiments, a learning model (e.g., a classification model) may be trained using machine learning techniques to predict whether a survey will result in a survey response. For example, to train such a model, historical survey and survey response data (e.g., information regarding past surveys and survey responses) can be collected. Once this data is collected, the features that are correlated to or influence the prediction of whether a survey will result in or otherwise generate a survey response, or will not result in a survey response, can be identified from the corpus of historical survey and survey response data. These relevant features can then be used to generate a training dataset that can be used to train the model. Once trained using the training dataset, the trained model can be used to predict, provided information (e.g., features) regarding a survey, whether the survey will result in a survey response. In other words, once trained, the trained model can predict, for a new survey that is generated, whether a survey response corresponding to the new survey will be received.

According to some embodiments disclosed herein, the survey generation framework may include a trained machine learning model that can be used to predict an estimated score for a survey. To this end, in some embodiments, a learning model (e.g., a regression model) may be trained using machine learning techniques to predict an estimated score for a survey. For example, to train such a model, historical survey and survey response score data (e.g., information regarding past surveys and survey response scores) can be collected. Once this data is collected, the features that are correlated to or influence the prediction of an estimated score for a survey can be identified from the corpus of historical survey and survey response score data. These relevant features can then be used to generate a training dataset that can be used to train the model. Once trained using the training dataset, the trained model can be used to predict, provided information (e.g., features) regarding a survey, an estimated score for the survey.

Referring now to the figures, FIG. 1 is a diagram illustrating selected components of an example system architecture 100 including a survey processing system 102, in accordance with an embodiment of the present disclosure. An enterprise, for instance, may implement survey processing system 102 to provide an efficient survey generation framework that is responsive to survey request events in accordance with certain of the embodiments disclosed herein. As shown, survey processing system 102 includes a survey workflow module 104, a survey request prediction module 106, a survey response prediction module 108, a survey score estimation module 110, and a survey request/response repository 112. Survey processing system 102 can include various other hardware and software components which, for the sake of clarity, are not shown in FIG. 1. It is also appreciated that survey processing system 102 may not include certain of the components depicted in FIG. 1. For example, in certain embodiments, survey processing system 102 may not include survey response prediction module 108. As another example, in some embodiments, survey processing system 102 may not include survey score estimation module 110. Thus, it should be appreciated that numerous configurations of survey processing system 102 can be implemented and the present disclosure is not intended to be limited to any particular one.

The various components of architecture 100, including the components of survey processing system 102, may be communicably coupled to one another via one or more networks (not shown). The network may correspond to one or more wired or wireless computer networks including, but not limited to, local area networks (LANs), wide area networks (WANs), personal area networks (PANs), metropolitan area networks (MANs), storage area networks (SANs), virtual private networks (VPNs), wireless local-area networks (WLAN), primary public networks, primary private networks, Wi-Fi (i.e., 802.11) networks, other types of networks, or some combination of the above.

As shown in FIG. 1, architecture 100 also includes one or more survey systems 114 and enterprise systems 116. In brief, survey systems 114 provide for the overall management and processing of surveys for the enterprise. For example, survey systems 114 may provide handling and processing of survey questionnaires sent to the enterprise's customers, suppliers, and/or partners such as employees, associates, and service providers. Survey systems 114 may also provide the processing and reporting of survey responses generated by or otherwise received from the survey respondents. In some embodiments, one or more of the survey systems 114 may be provided by third-party survey vendors.

Enterprise systems 116 provide for the overall management such as tracking and control, among others, of the operations, including complex operations, of the enterprise. For example, the enterprise may implement and utilize enterprise systems 116 to improve its business processes (e.g., customer service processes) and workflows, including certain implementations of the efficient survey generation framework described herein. In particular, according to some embodiments, enterprise systems 116 can generate the survey request events for processing by survey processing system 102. To this end, as shown in FIG. 1, enterprise systems 116 can include a sales system 116a, an order management system 116b, a supply chain system 116c, and a customer relationship management (CRM) system 116d.

Sales system 116a provides management of the enterprise's various processes for managing sales opportunities. For example, employees (e.g., sales associates) and others associated with the enterprise can use the various processes of sales system 116a to track data, perform administrative tasks, and manage sales leads, among others. At various stages in the different processes, sales system 116a may generate a survey request event, which is a request for a survey to be sent to a survey respondent. For example, upon completion of an initial customer contact, sales system 116a may generate a survey request event requesting that a survey be sent to the contacted customer to obtain feedback regarding the customer's initial contact experience. As another example, upon upsell to an existing customer, a survey may be sent to the existing customer to, for example, understand ease of processing and overall experience for the sales change order. Surveys may also be internal, for example the assignment of a cross-department task to an associate of the enterprise (e.g., transition from sales order to a Finance team, so billing can start for the customer). For instance, sales system 116a may generate a survey request event requesting that a survey be sent to the Finance team associate to obtain feedback regarding the completeness of sales SKU information and overall associate's task assignment experience.

Order management system 116b provides management of the enterprise's back-end processes for managing and fulfilling orders. Order management system 116b can provide tracking of sales, orders, inventory, and fulfillment as well as facilitating automation between the enterprise's various service providers. Order management system 116b enables the enterprise to manage orders coming in (i.e., booked orders) from multiple sales channels and going out of multiple fulfillment points. At various stages in the different processes, order management system 116b may generate a survey request event. For example, upon placement of an order by a customer, order management system 116b may generate a survey request event requesting that a survey be sent to the customer to obtain feedback regarding the customer's purchasing experience. As another example, upon fulfilling an order placed by a customer, order management system 116b may generate a survey request event requesting that a survey be sent to the customer to obtain feedback regarding the customer's order fulfillment/delivery experience.

Supply chain system 116c provides management of the enterprise's supply chain processes, including planning, sourcing, producing, delivering, and providing for returns. Supply chain system 116c can provide efficient handling of the flow of goods from the enterprise's suppliers to the enterprise's customers. At various stages in the different processes, supply chain system 116c may generate a survey request event. For example, upon delivery of a manufacturing part(s) by a supply vendor, supply chain system 116c may generate a survey request event requesting that a survey be sent to the vendor to obtain feedback regarding the vendor's experience in dealing with the enterprise.

CRM system 116d provides management of the enterprise's processes for managing marketing and customer communications. CRM system 116d can provide functionalities such as analytics, artificial intelligence, contact center automation, support center automation, and marketing communication, among others. At various stages in the different processes, CRM system 116d may generate a survey request event. For example, upon entry of a customer call incident ticket, CRM system 116d may generate a survey request event requesting that a survey be sent to a customer who generated the customer call incident ticket to obtain feedback regarding the customer's incident reporting and/or support experience. As another example, upon closure of a customer incident ticket, CRM system 116d may generate a survey request event requesting that a survey be sent to the customer to obtain feedback regarding the customer's incident handling experience. As still another example, upon closure of an incident ticket by an associate of the enterprise, CRM system 116d may generate a survey request event requesting that a survey be sent to the associate who handled and/or closed the incident ticket to obtain feedback regarding the associate's incident processing experience.

Still referring to FIG. 1, survey request/response repository 112 stores or otherwise records the historical survey request event and survey data. The historical survey request event and survey data may include information regarding the past survey request events generated, for example, by the various enterprise systems 116, and the surveys generated in response to the survey request events. For example, as can be seen in FIG. 1, the historical survey request event and survey data may be collected or otherwise obtained from the enterprise's survey systems 114. Thus, in such embodiments, survey request/response repository 112 can be understood as a storage point for data that is collected from survey systems 114 and that is used to generate a training dataset that can be used to train a model (e.g., survey request prediction module 106) to predict whether a survey request event will result in a survey (e.g., predict whether a survey is to be generated for a survey request event).

The historical survey request event and survey data may be stored in a tabular format. In the table, the structured columns represent the features (also called variables) and each row represents an observation or instance (e.g., whether a survey is generated for a survey request event). Thus, each column in the table shows a different feature of the instance. In some embodiments, survey request/response repository 112 can perform preliminary operations with the collected historical survey request event and survey data (i.e., information regarding the past survey request events and the surveys generated in response to the survey request events) to generate the training dataset. For example, the preliminary operations may include null data handling (e.g., the handling of missing values in the table). According to one embodiment, null or missing values in a column (a feature) may be replaced by a mode or median value of the values in that column. According to alternative embodiments, observations (i.e., generated surveys) in the table with null or missing values in a column may be removed from the table.

The preliminary operations may also include feature selection and/or data engineering to determine (e.g., identify) the relevant features from the historical survey request event and survey data. The relevant features are the features that are more correlated with the thing being predicted by the trained model (e.g., whether a survey request event will result in a survey). A variety of feature engineering techniques, such as exploratory data analysis (EDA) and/or bivariate data analysis with multivariate-variate plots and/or correlation heatmaps and diagrams, among others, may be used to determine the relevant features. Such feature engineering may be performed to reduce the dimension and complexity of the trained model, hence improving its accuracy and performance.

The preliminary operations may also include data preprocessing to place the data (information) in the table into a format that is suitable for training a model. For example, since machine learning deals with numerical values, textual categorical values (i.e., free text) in the columns (e.g., event source, event type, event status, internal/external, destination, location, etc.) can be converted (i.e., encoded) into numerical values. According to one embodiment, the textual categorical values may be encoded using label encoding. According to alternative embodiments, the textual categorical values may be encoded using one-hot encoding.

FIG. 2 is a diagram showing an illustrative data structure 200 that represents a training dataset for training a learning model to predict whether a survey request event will result in a survey, in accordance with an embodiment of the present disclosure. More specifically, data structure 200 may be in a tabular format in which the structured columns represent the different relevant features (variables) regarding the survey request events and a row represents each survey request event. The relevant features illustrated in data structure 200 are merely examples of features that may be extracted from the historical survey request event and survey data and used to generate a training dataset and should not be construed to limit the embodiments described herein.

As shown in FIG. 2, the relevant features may include an event source 202, an event type 204, an event status 206, an internal/external 208, a destination 210, a location 212, a language 214, a mode 216, and a survey requested 218. Event source 202 indicates the source of the survey request event. Examples of such sources include the various enterprise systems 116. Event type 204 indicates a type of survey request event. Examples of survey request event types include booking (e.g., product order booking), work order (e.g., maintenance work order), case (e.g., software support request case, hardware proactive maintenance case, hardware replacement under entitlement case), and incident (e.g., platform or application completely down incident, application partial functionality not working, password issues, database or application not reachable), among others. Event status 206 indicates a status (e.g., "in process", "complete", "closure", etc.) of the survey request event. For example, in accordance with one embodiment, a survey request event may qualify for a survey once the processes, including any subprocesses and subtasks, associated with the survey request event are completed and/or closed. For instance, a maintenance work order survey request event may qualify for a survey once the maintenance work order is completed and closed. Internal/external 208 indicates whether the survey requested by the survey request event is an "internal" survey or an "external" survey. For example, an internal survey may be a survey regarding internal collaboration between the enterprise's employees. An internal survey is a survey that is typically sent to an employee of the enterprise. Conversely, external surveys may be surveys directed toward survey respondents who are external to the organization. An external survey is a survey that is typically sent to a customer. Destination 210 indicates a recipient of the requested survey. Location 212 indicates a location (e.g., city, state, country, continent, etc.) to which the requested survey is to be sent and/or conducted. For example, location 212 may be related to a customer specific site location for product delivery, replacement parts delivery, and onsite support, among others. Language 214 indicates a language for the requested survey. Mode 216 indicates a mode (e.g., phone, email, chat, etc.) for the requested survey. Survey requested 216 indicates whether the survey request event resulted in a survey (e.g., "1 (yes)") or did not result in a survey (e.g., "0 (no)").

In data structure 200, each row may represent a training sample (i.e., an instance of a training sample) in the training dataset, and each column may show a different relevant feature of the training sample. Each training sample may correspond to a past survey request event. As can be seen in FIG. 2, four training samples 220, 222, 224, 226 are illustrated in data structure 200. In some embodiments, the individual training samples 220, 222, 224, 226 may be used to generate a feature vector, which is a multi-dimensional vector of elements or components that represent the features in a training sample. In such embodiments, the generated feature vectors may be used for training a model to predict whether a survey request event will result in a survey. The features event source 202, event type 204, event status 206, internal/external 208, destination 210, location 212, language 214, and mode 216 may be included in a training sample as the independent variables, and the feature survey requested 218 included as the dependent (or target) variable in the training sample. Note that the number of training samples depicted in data structure 200 is for illustration, and those skilled in the at will appreciate that the training dataset may, and likely will, include large and sometimes very large numbers of training samples.

Referring again to FIG. 1, in some embodiments, survey request/response repository 112 may store or otherwise record the historical survey and survey response data. The historical survey and survey response data may include information regarding the past surveys generated by the enterprise and the survey responses generated from these surveys. As can be seen in FIG. 1, similar to the historical survey request event and survey data described above, the historical survey and survey response data may be collected or otherwise obtained from the enterprise's survey systems 114. Thus, in such embodiments, survey request/response repository 112 can be understood as a storage point for data that is collected from survey systems 114 and that is used to generate a training dataset that can be used to train a model (e.g., survey response prediction module 108) to predict whether a survey will result in a survey response (e.g., predict whether a survey response will be received for a generated survey).

The historical survey and survey response data may be stored in a tabular format. In the table, the structured columns represent the features (also called variables) and each row represents an observation or instance (e.g., whether a survey results in a survey response). Thus, each column in the table shows a different feature of the instance. In some embodiments, survey request/response repository 112 can perform preliminary operations with the collected historical survey and survey response data (i.e., information regarding the past surveys and the survey responses generated in response to the surveys) to generate the training dataset. For example, similar to the preliminary operations with the historical survey request event and survey data described above, the preliminary operations may include null data handling of missing values in the table, feature selection and/or data engineering to determine (e.g., identify) the relevant features from the historical survey and survey response data, and/or data preprocessing to place the data (information) in the table into a format that is suitable for training a model, as described above.

FIG. 3 is a diagram showing an illustrative data structure 300 that represents a training dataset for training a learning model to predict whether a survey will result in a survey response, in accordance with an embodiment of the present disclosure. Data structure 300 may be in a tabular format in which the structured columns represent the different relevant features (variables) regarding the surveys and a row represents each generated survey. The relevant features illustrated in data structure 300 are merely examples of features that may be extracted from the historical survey and survey response data and used to generate a training dataset and should not be construed to limit the embodiments described herein.

As shown in FIG. 3, the relevant features may include a request source 302, a request type 304, an internal/external 306, a destination 308, a location 310, a language 312, a question ID 314, a mode 316, and a response received 318. Request source 302, request type 304, internal/external 306, destination 308, location 310, language 312, and mode 316 are substantially similar to event source 202, event type 204, internal/external 208, destination 210, location 212, language 214, and mode 216, respectively, previously described with respect to data structure 200 of FIG. 2, and that relevant discussion is equally applicable here. Question ID 314 identifies a template that is used to generate the survey. For example, the enterprise can preconfigure or define one or more templates of questions to include in a survey. The preconfigured templates can then be used to generate corresponding surveys. For example, a first template may be preconfigured for use in generating a survey to solicit feedback regarding a customer's overall purchasing experience. As another example, a second template may be preconfigured for use in generating a survey to solicit feedback regarding a customer's experience in interacting with the enterprise's support center. In any case, the enterprise may preconfigure or define various templates that can be used to generate different surveys. Response received 318 indicates whether the survey resulted in a survey response (e.g., "1 (yes)") or did not result in a survey response (e.g., "0 (no)").

Similar to data structure 200 described above, in data structure 300, each row may represent a training sample (i.e., an instance of a training sample) in the training dataset, and each column may show a different relevant feature of the training sample. Each training sample may correspond to a past survey generated by the enterprise. As can be seen in FIG. 3, four training samples 320, 322, 324, 326 are illustrated in data structure 300. In some embodiments, the individual training samples 320, 322, 324, 326 may be used to generate a feature vector, which is a multi-dimensional vector of elements or components that represent the features in a training sample. In such embodiments, the generated feature vectors may be used for training a model to predict whether a survey will result in a survey response. The features request source 302, request type 304, internal/external 306, destination 308, location 310, language 312, question ID 314, and mode 316 may be included in a training sample as the independent variables, and the feature response received 318 included as the dependent (or target) variable in the training sample. Note that the number of training samples depicted in data structure 300 is for illustration, and those skilled in the at will appreciate that the training dataset may, and likely will, include large and sometimes very large numbers of training samples.

Referring again to FIG. 1, in some embodiments, survey request/response repository 112 may store or otherwise record the historical survey and survey response score data. The historical survey and survey response score data may include information regarding the past surveys generated by the enterprise and the scores of the survey responses generated from these surveys. For example, each question in a survey may be assigned a score (e.g., a continuous number between 0-5 or 0-10), and a survey response score may be calculated or otherwise determined based on the responses to the questions. As can be seen in FIG. 1, similar to the historical survey request event and survey data described above, the historical survey and survey response score data may be collected or otherwise obtained from the enterprise's survey systems 114. Thus, in such embodiments, survey request/response repository 112 can be understood as a storage point for data that is collected from survey systems 114 and that is used to generate a training dataset that can be used to train a model (e.g., survey score estimation module 110) to predict an estimated score for a survey.

The historical survey and survey response score data may be stored in a tabular format. In the table, the structured columns represent the features (also called variables) and each row represents an observation or instance (e.g., a survey score of a survey response). Thus, each column in the table shows a different feature of the instance. In some embodiments, survey request/response repository 112 can perform preliminary operations with the collected historical survey and survey response score data (i.e., information regarding the past surveys and the scores of the survey responses generated from these surveys) to generate the training dataset. For example, similar to the preliminary operations with the historical survey request event and survey data described above, the preliminary operations may include null data handling of missing values in the table, feature selection and/or data engineering to determine (e.g., identify) the relevant features from the historical survey and survey response score data, and/or data preprocessing to place the data (information) in the table into a format that is suitable for training a model, as described above.

FIG. 4 is a diagram showing an illustrative data structure 400 that represents a training dataset for training a learning model to predict an estimated score for a survey, in accordance with an embodiment of the present disclosure. Data structure 400 may be in a tabular format in which the structured columns represent the different relevant features (variables) regarding the surveys and a row represents each generated survey. The relevant features illustrated in data structure 400 are merely examples of features that may be extracted from the historical survey and survey response score data and used to generate a training dataset and should not be construed to limit the embodiments described herein.

As shown in FIG. 4, the relevant features may include a request source 402, a request type 404, an internal/external 406, a destination 408, a location 410, a language 412, a question ID 414, a mode 416, and a score received 418. Request source 402, request type 404, internal/external 406, destination 408, location 410, language 412, question ID 414, and mode 416 are substantially similar to request source 302, request type 304, internal/external 306, destination 308, location 310, language 312, and mode 316, respectively, previously described with respect to data structure 300 of FIG. 3, and that relevant discussion is equally applicable here. Score received 418 indicates a score of a survey response generated from the survey.

Similar to data structure 300 described above, in data structure 400, each row may represent a training sample (i.e., an instance of a training sample) in the training dataset, and each column may show a different relevant feature of the training sample. Each training sample may correspond to a past survey generated by the enterprise. As can be seen in FIG. 4, four training samples 420, 422, 424, 426 are illustrated in data structure 400. In some embodiments, the individual training samples 420, 422, 424, 426 may be used to generate a feature vector, which is a multi-dimensional vector of elements or components that represent the features in a training sample. In such embodiments, the generated feature vectors may be used for training a model to predict an estimated score for a survey. The features request source 402, request type 404, internal/external 406, destination 408, location 410, language 412, question ID 414, and mode 416 may be included in a training sample as the independent variables, and the feature score received 418 included as the dependent (or target) variable in the training sample. Note that the number of training samples depicted in data structure 400 is for illustration, and those skilled in the at will appreciate that the training dataset may, and likely will, include large and sometimes very large numbers of training samples.

Referring again to FIG. 1, survey workflow module 104 can process the survey request events generated by the various enterprise systems 116. A survey request event is a request for a survey (i.e., a request that a survey be sent to a survey respondent) and may be generated at various stages of the processes provided by enterprise systems 116. It may be the case that not all survey request events result in a survey. That is, a survey request may not result in a survey. In some embodiments, survey workflow module 104 can leverage survey request prediction module 106 to predict whether a survey request event will result in a survey. Survey workflow module 104 can then generate a survey for a survey request event in response to predicting that the survey request event will result in a survey.

In some embodiments, survey workflow module 104 can leverage survey systems 114 to conduct a survey, For example, upon determining that a survey is to be generated for a survey request event, survey workflow module 104 can identify a specific template that is appropriate for the survey. The template may be identified based on the characteristics of the survey request event. Survey workflow module 104 can then send a survey request, along with the template and information related to the survey request event (e.g., survey recipient, type of survey, location, language, source of the survey, etc.), to one or more survey systems 114. In response to the survey request, survey system 114 can generate a survey based on the received the template and the information related to the survey request event and conduct the survey.

In some embodiments, survey workflow module 104 can leverage survey response prediction module 108 to predict whether a survey will result in a survey response. For example, upon generating a survey, survey workflow module 104 can leverage survey response prediction module 108 to predict (e.g., determine) whether a survey response will be received. For example, executive management of the enterprise may have customer satisfaction as one of their top performance indicators. Predicting if survey responses will be received, be it for the entire survey or for specific questions can be beneficial, as they can help tune survey questions and survey communication channels in a way where higher response rates are predicted. The more customer responses surveys generate, the more feedback the enterprise obtains from their customers and the more chance the enterprise has to improvise on their products and services.

In some embodiments, survey workflow module 104 can leverage survey score estimation module 110 to predict an estimated score for a survey. For example, upon generating a survey, survey workflow module 104 can leverage survey score estimation module 110 to predict an estimated survey response score. For example, a bad customer experience can cost the enterprise an entire customer relationship. If the enterprise can predict a survey score in advance, management will have a way to take corrective course of action to regain customer trust before the customer even sends a survey response. Time may be important in cases where customer good-will is involved and using artificial intelligence to understand customer sentiment in advance can save business opportunities, renewals, etc.

Referring still to FIG. 1, survey request prediction module 106 can whether a survey request event will result in a survey (i.e., generation of a survey). To this end, in some embodiments, survey request prediction module 106 includes a learning model (e.g., a dense neural network (DNN)) that is trained using machine learning techniques with a training dataset generated using historical survey request event-survey data. The DNN may be a binary classification model (e.g., a classifier). In such embodiments, the training dataset may be provided by survey request/response repository 112. In some embodiments, a randomly selected portion of the training dataset can be used for training the DNN, and the remaining portion of the training dataset can be used as a testing dataset. In one embodiment, 70% of the training dataset can be used to train the model, and the remaining 30% can be used to form the testing dataset. The model can then be trained using the portion of the training dataset (i.e., 70% of the training dataset) designated for training the model. Once trained, the testing dataset can be applied to the trained model to evaluate the performance of the trained model.

In brief, the DNN includes an input layer for all input variables such as event source, event type, event status, internal/external, etc., multiple hidden layers for feature extraction, and an output layer. Each layer may be comprised of a number of nodes or units embodying an artificial neuron (or more simply a "neuron"). As a DNN, each neuron in a layer receives an input from all the neurons in the preceding layer. In other words, every neuron in each layer is connected to every neuron in the preceding layer and the succeeding layer. As a binary classification model, the output layer is comprised of a single neuron, which outputs a first numerical value (e.g., 1) that represents Yes (generate survey) and a second numerical value (e.g., 0) that represents No (do not generate survey).

Figure 5:
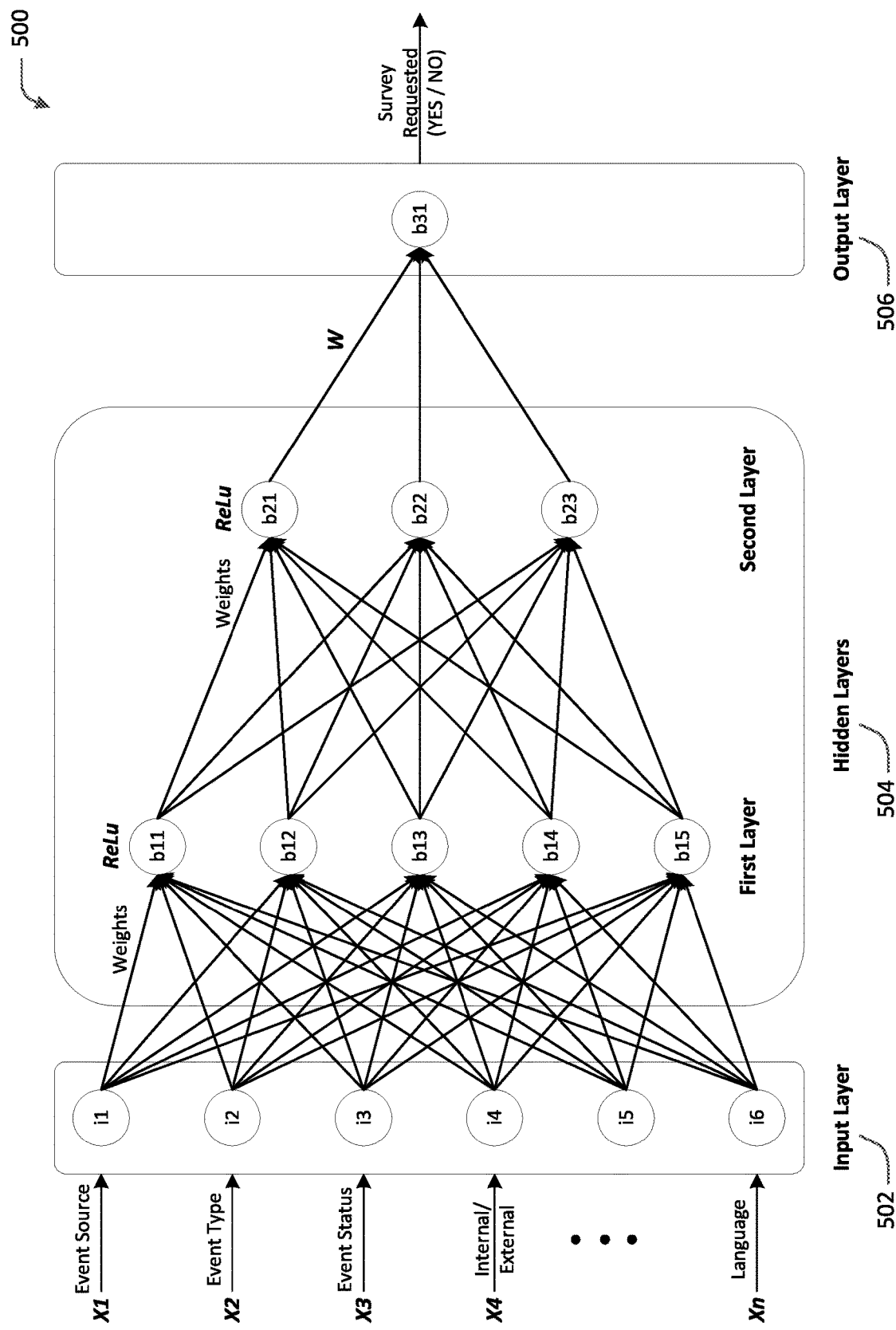
FIG. 5 is a diagram illustrating an example architecture of a dense neural network (DNN) model of a survey request prediction module, in accordance with an embodiment of the present disclosure.

In more detail, and as shown in FIG. 5, a DNN 500 includes an input layer 502, multiple hidden layers 504 (e.g., two hidden layers), and an output layer 506. Input layer 502 may be comprised of a number of neurons to match (i.e., equal to) the number of input variables (independent variables). Taking as an example the independent variables illustrated in data structure 200 (FIG. 2), input layer 502 may include 8 neurons to match the 8 independent variables (e.g., event source 202, event type 204, event status 206, internal/external 208, destination 210, location 212, language 214, and mode 216), where each neuron in input layer 502 receives a respective independent variable. Each succeeding layer (e.g., a first layer and a second layer) in hidden layers 504 will further comprise an arbitrary number of neurons, which may depend on the number of neurons included in input layer 502. For example, according to one embodiment, the number of neurons in the first hidden layer may be determined using the relation $2^n \geq$ number of neurons in input layer, where n is the smallest integer value satisfying the relation. In other words, the number of neurons in the first layer of hidden layers 504 is the smallest power of 2 value equal to or greater than the number of neurons in input layer 502. For example, in the case where there are 19 input variables, input layer 502 will include 19 neurons. In this example case, the first layer can include 32 neurons (i.e., $2^5=32$). Each succeeding layer in hidden layers 504 may be determined by decrementing the exponent n by a value of one. For example, the second layer can include 16 neurons (i.e., $2^4=16$). In the case where there is another succeeding layer (e.g., a third layer) in hidden layers 504, the third layer can include 8 neurons (i.e., $2^3=8$). As a binary classification model, output layer 506 includes a single neuron.

Although FIG. 5 shows hidden layers 504 comprised of only two layers, it will be understood that hidden layers 504 may be comprised of a different number of hidden layers. Also, the number of neurons shown in the first layer and in the second layer of hidden layers 504 is for illustration only, and it will be understood that actual numbers of neurons in the first layer and in the second layer of hidden layers 504 may be based on the number of neurons in input layer 502.

Each neuron in hidden layers 504 and the neuron in output layer 506 may be associated with an activation function. For example, according to one embodiment, the activation function for the neurons in hidden layers 504 may be a rectified linear unit (ReLU) activation function. As DNN 500 is to function as a binary classification model, the activation function for the neuron in output layer 506 may be a sigmoid activation function.

Since this is a dense network, as can be seen in FIG. 5, each neuron in the different layers may be coupled to one another. Each coupling (i.e., each interconnection) between two neurons may be associated with a weight, which may be learned during a learning or training phase. Each neuron may also be associated with a bias factor, which may also be learned during a training process.

During a first pass (epoch) in the training phase, the weight and bias values may be set randomly by the neural network. For example, according to one embodiment, the weight and bias values may all be set to 1 (or 0). Each neuron may then perform a linear calculation by combining the multiplication of each input variables (x1, x2, . . . ) with their weight factors and then adding the bias of the neuron. The formula for this calculation may be as follows:

$$ws1 = x1 \cdot w1 + x2 \cdot w2 + \ldots + b1,$$

where ws1 is the weighted sum of the neuron1, x1, x2, etc. are the input values to the model, w1, w2, etc. are the weight values applied to the connections to the neuron1, and b1 is the bias value of neuron1. This weighted sum is input to an activation function (e.g., ReLU) to compute the value of the activation function. Similarly, the weighted sum and activation function values of all the other neurons in a layer are calculated. These values are then fed to the neurons of the succeeding (next) layer. The same process is repeated in the succeeding layer neurons until the values are fed to the neuron of output layer 506. Here, the weighted sum may also be calculated and compared to the actual target value. Based on the difference, a loss value is calculated. The loss value indicates the extent to which the model is trained (i.e., how well the model is trained). This pass through the neural network is a forward propagation, which calculates the error and drives a backpropagation through the network to minimize the loss or error at each neuron of the network. Considering the error/loss is generated by all the neurons in the network, backpropagation goes through each layer from back to forward and attempts to minimize the loss using, for example, a gradient descent-based optimization mechanism or some other optimization method. Since the neural network is used as a binary classifier, binary cross entropy may be used as the loss function, adaptive movement estimation (Adam) as the optimization algorithm, and "accuracy" as the validation metric. In other embodiments, unpublished optimization algorithm designed for neural networks (RMSprop) may be used as the optimization algorithm.

The result of this backpropagation is used to adjust (update) the weight and bias values at each connection and neuron level to reduce the error/loss. An epoch (one pass of the entire training dataset) is completed once all the observations of the training data are passed through the neural network. Another forward propagation (e.g., epoch 2) may then be initiated with the adjusted weight and bias values and the same process of forward and backpropagation may be repeated in the subsequent epochs. Note that a higher loss value means the model is not sufficiently trained. In this case, hyperparameter tuning may be performed. Hyperparameter tuning may include, for example, changing the loss function, changing optimizer algorithm, and/or changing the neural network architecture by adding more hidden layers. Additionally or alternatively, the number of epochs can be also increased to further train the model. In any case, once the loss is reduced to a very small number (ideally close to zero (0)), the neural network is sufficiently trained for prediction.

DNN 500 can be built by first creating a shell model and then adding desired number of individual layers to the shell model. For each layer, the number of neurons to include in the layer can be specified along with the type of activation function to use and any kernel parameter settings. Once DNN 500 is built, a loss function (e.g., binary cross entropy), an optimizer algorithm (e.g., Adam or a gradient-based optimization technique such as RMSprop), and validation metrics (e.g., "accuracy") can be specified for training, validating, and testing DNN 400.

DNN 500 can then be trained by passing the portion of the training dataset (e.g., 70% of the training dataset) designated for training and specifying a number of epochs. An epoch (one pass of the entire training dataset) is completed once all the observations of the training data are passed through DNN 500. DNN 500 can be validated once DNN 500 completes the specified number of epochs. For example, DNN 500 can process the training dataset and the loss/error value can be calculated and used to assess the performance of DNN 500. The loss value indicates how well DNN 500 is trained. Note that a higher loss value means DNN 500 is not sufficiently trained. In this case, hyperparameter tuning may be performed. Hyperparameter tuning may include, for example, changing the loss function, changing optimizer algorithm, and/or changing the neural network architecture by adding more hidden layers. Additionally or alternatively, the number of epochs can be also increased to further train DNN 500. In any case, once the loss is reduced to a very small number (ideally close to 0), DNN 500 is sufficiently trained for prediction. Prediction of the model (e.g., DNN 500) can be achieved by passing the independent variable of test data (i.e., for comparing train vs. test) or the real values that need to be predicted to predict whether a survey is to be generated or not generated (i.e., target variable) for a survey request event.

Figure 6:
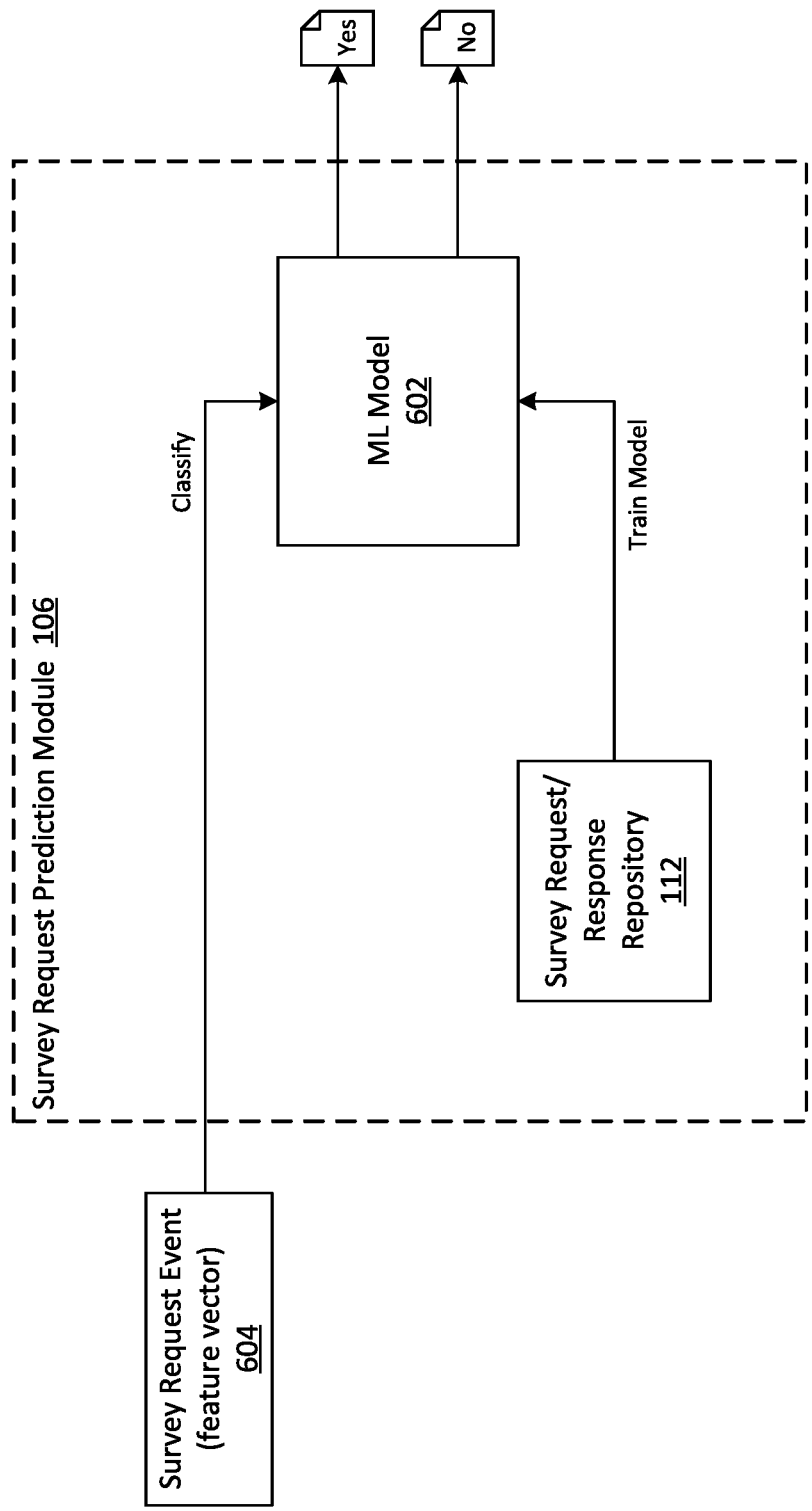
FIG. 6 is a diagram showing an example survey request prediction topology that can be used to predict whether a survey request event will result in a survey, in accordance with an embodiment of the present disclosure.

Once sufficiently trained, as illustrated in FIG. 6 in which like elements of FIG. 1 are shown using like reference designators, survey request prediction module 106 can be used to predict to predict whether a survey request event will result in a survey. As shown in FIG. 6, survey request prediction module 106 includes a machine learning (ML) model 602. As described previously, according to one embodiment, ML model 602 can be a DNN (e.g., DNN 500 of FIG. 5). ML model 602 can be trained and tested using machine learning techniques with a training dataset provided by survey request/response repository 112. As described previously, the training dataset for ML model 602 may be generated from the historical survey request event-survey data. The trained ML model 602 can then be used to predict whether a survey is to be generated ("Yes") or not generated ("No") for a survey request event 604. For example, a feature vector that represents the features from survey request event 604, such as event source, event type, event status, internal/external, destination, etc., may be input, passed, or otherwise provided to the trained ML model 602. In some embodiments, the input feature vector may include the same features used in training the trained ML model 602.

Referring again to FIG. 1, survey response prediction module 108 can predict whether a survey will result in a survey response. In other words, survey response prediction module 108 can predict whether a survey sent to a survey respondent will result in a response from the survey respondent. To this end, in some embodiments, survey response prediction module 108 includes a learning model (e.g., a random forest classification model) that is trained using machine learning techniques with a training dataset generated using historical survey and survey response data. In such embodiments, the training dataset may be provided by survey request/response repository 112. In some embodiments, a randomly selected portion of the training dataset can be used for training the random forest classification model, and the remaining portion of the training dataset can be used as a testing dataset. In one embodiment, 70% of the training dataset can be used to train the model (random forest classifier), and the remaining 30% can be used to form the testing dataset. The model can then be trained using the portion of the training dataset (i.e., 70% of the training dataset) designated for training the model. Once trained, the testing dataset can be applied to the trained model to evaluate the performance of the trained model. The performance (e.g., accuracy) of the model can be improved as desired by, for example, tuning the hyperparameters such as criterion, the maximum number of children nodes that can grow out from the decision tree until the tree is cut off (max depth), and the number of estimators (n_estimators), among others. Other metrics such as precision, recall, and F1 score, may be calculated to gauge the behavior of the model.

Figure 7:
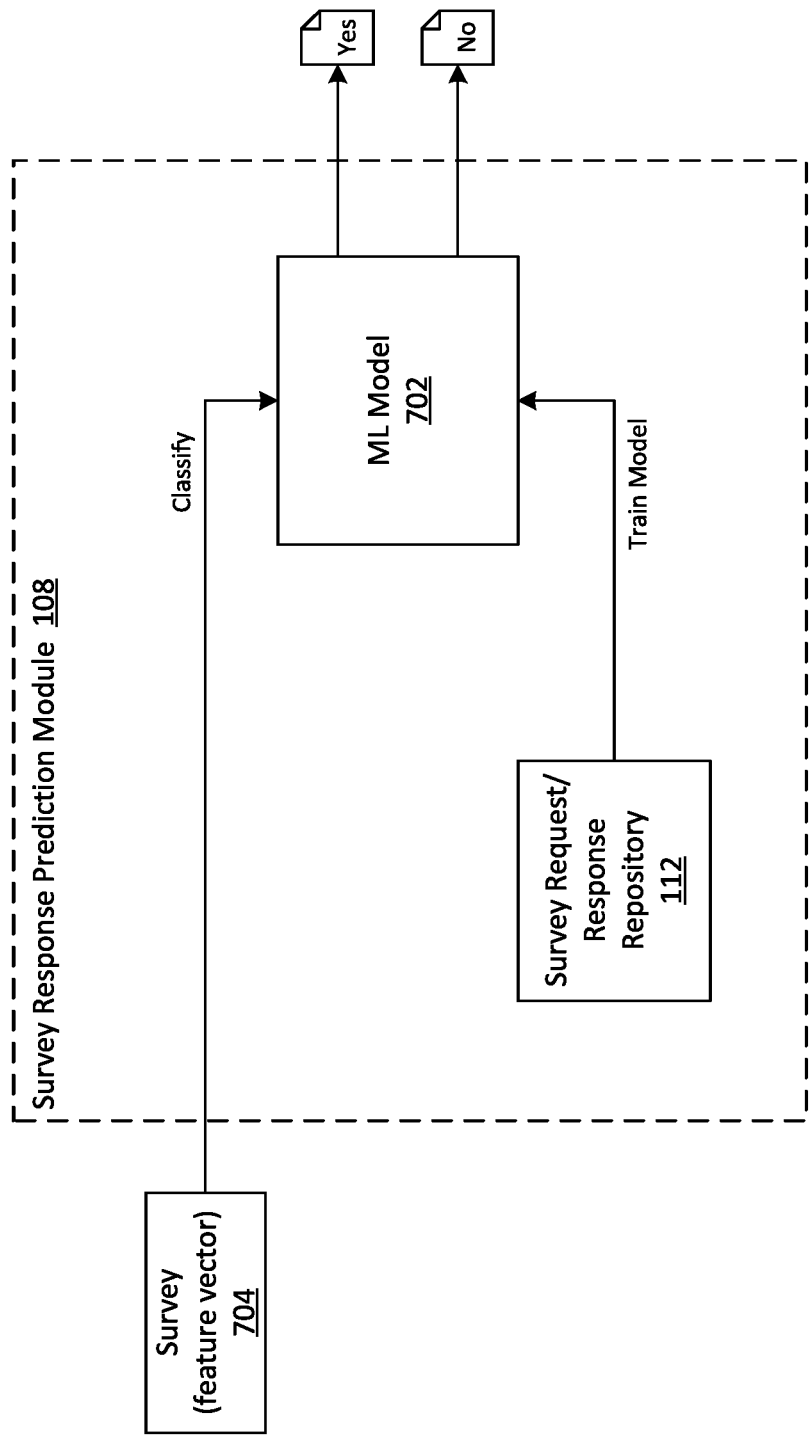
FIG. 7 is a diagram showing an example survey response prediction topology that can be used to predict a whether a survey results in a survey response, in accordance with an embodiment of the present disclosure.

Once sufficiently trained, as illustrated in FIG. 7 in which like elements of FIG. 1 are shown using like reference designators, survey response prediction module 108 can be used to predict whether a survey will result in a survey response. As shown in FIG. 7, survey response prediction module 108 includes a machine learning (ML) model 702. ML model 702 can be trained and tested using machine learning techniques with a training dataset provided by survey request/response repository 112. As described previously, the training dataset for ML model 702 may be generated from the historical survey and survey response data. In the training dataset for ML model 702, the target variable may be the likelihood of receiving a survey response for a survey, which may be a binary value. The trained ML model 702 can then be used to predict whether a survey response will be received ("Yes") or will not be received ("No") for a survey 704. For example, a feature vector that represents the features from survey 704, such as request source, request type, internal/external, destination, question ID, mode, etc., may be input, passed, or otherwise provided to the trained ML model 702. In some embodiments, the input feature vector may include the same features used in training the trained ML model 702.

Referring again to FIG. 1, survey score estimation module 110 can predict an estimated score for a survey. In other words, survey response prediction module 108 can estimate a potential score that might come back as part of a survey response. To this end, in some embodiments, survey score estimation module 110 includes a learning model (e.g., a random forest regression model) that is trained using machine learning techniques with a training dataset generated using historical survey and survey response score data. In such embodiments, the training dataset may be provided by survey request/response repository 112. In some embodiments, a randomly selected portion of the training dataset can be used for training the random forest regression model, and the remaining portion of the training dataset can be used as a testing dataset. In one embodiment, 70% of the training dataset can be used to train the model (random forest regressor), and the remaining 30% can be used to form the testing dataset. The model can then be trained using the portion of the training dataset (i.e., 70% of the training dataset) designated for training the model. Once trained, the testing dataset can be applied to the trained model to evaluate the performance of the trained model. The performance (e.g., accuracy) of the model can be improved as desired by, for example, tuning the hyperparameters such as criterion, the maximum number of children nodes that can grow out from the decision tree until the tree is cut off (max depth), the number of maximum features provided to each tree (Max features), and bootstrap, among others.

Figure 8:
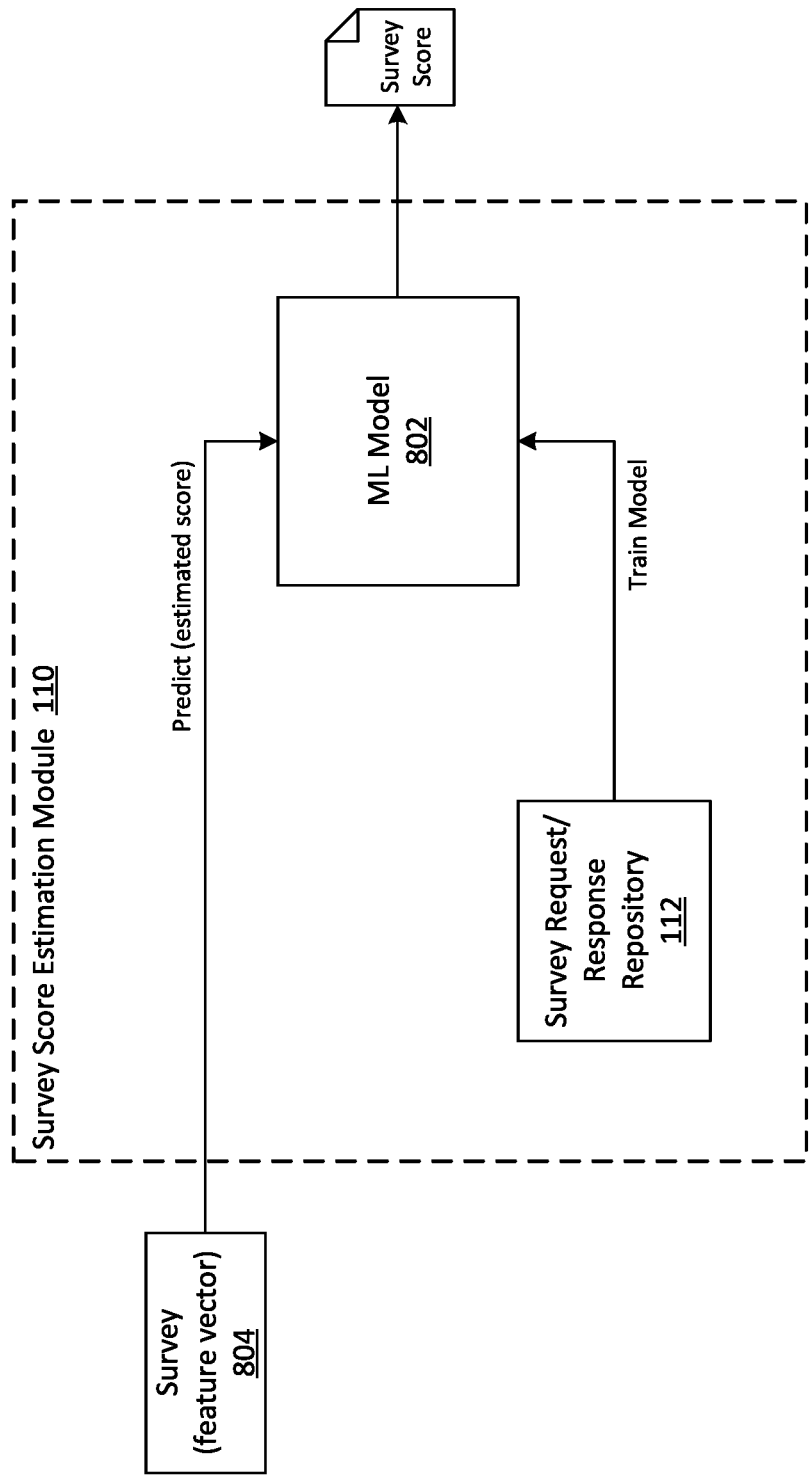
FIG. 8 is a diagram showing an example survey response score prediction topology that can be used to predict an estimated score for a survey, in accordance with an embodiment of the present disclosure.

Once sufficiently trained, as illustrated in FIG. 8 in which like elements of FIG. 1 are shown using like reference designators, survey score estimation module 110 can be used to predict an estimated score for a survey. As shown in FIG. 8 survey score estimation module 110 includes a machine learning (ML) model 802. ML model 802 can be trained and tested using machine learning techniques with a training dataset provided by survey request/response repository 112. As described previously, the training dataset for ML model 802 may be generated from the historical survey and survey response score data. In the training dataset for ML model 802, the target variable may be a numerical value that represent a score in or otherwise associated with a survey response (e.g., a continuous number between 0-5 or 0-10).

The trained ML model 702 can then be used to predict an estimated score (survey score) for a survey 804. For example, a feature vector that represents the features from survey 804, such as request source, request type, internal/external, destination, question ID, mode, etc., may be input, passed, or otherwise provided to the trained ML model 802. In some embodiments, the input feature vector may include the same features used in training the trained ML model 802.

Figure 9:
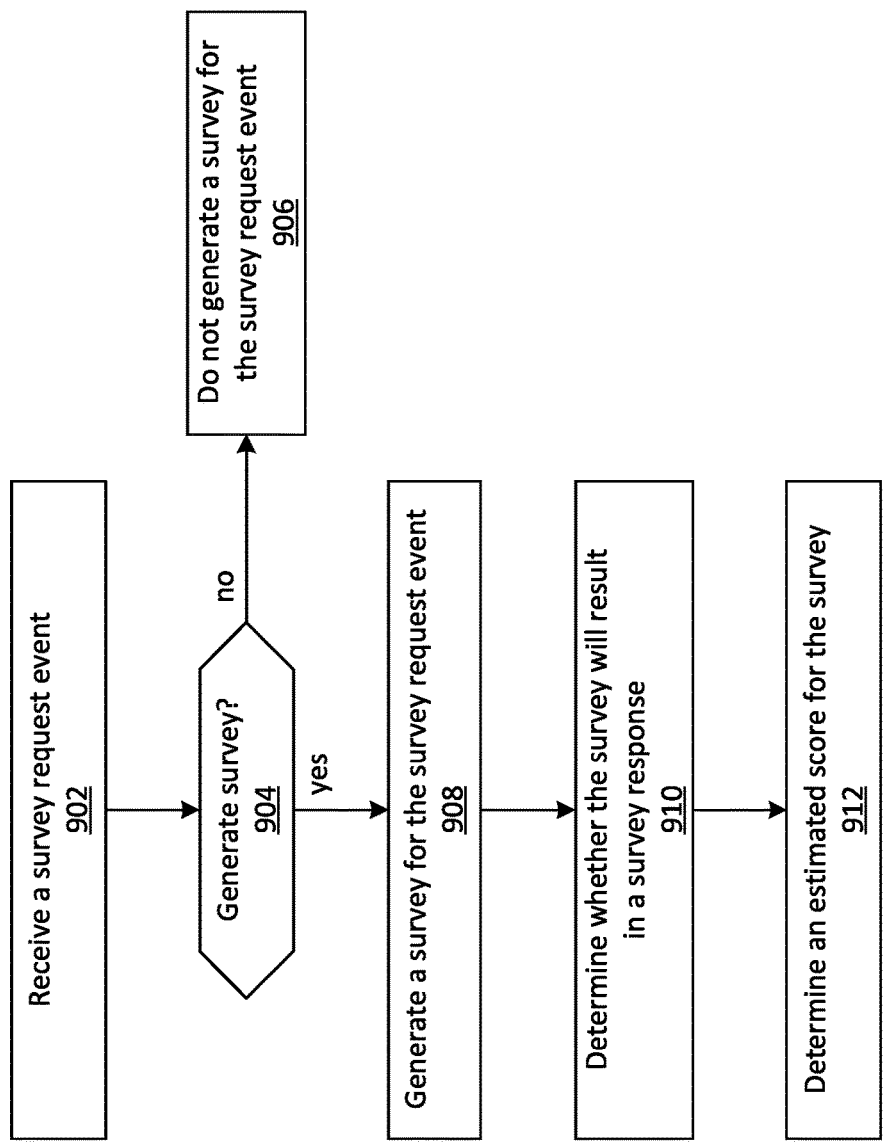
FIG. 9 is a flow diagram of an example process for generating a survey, in accordance with an embodiment of the present disclosure.

FIG. 9 is a flow diagram of an example process 900 for generating a survey, in accordance with an embodiment of the present disclosure. Process 900 may be implemented or performed by any suitable hardware, or combination of hardware and software, including without limitation the system shown and described with respect to FIG. 1, the computing device shown and described with respect to FIG. 10, or a combination thereof. For example, in some embodiments, the operations, functions, or actions illustrated in process 900 may be performed, for example, in whole or in part by survey workflow module 104, survey request prediction module 106, survey response prediction module 108, and survey score estimation module 110, or any combination of these including other components of survey processing system 102 described with respect to FIG. 1.

With reference to process 900 of FIG. 9, and in an illustrative use case, at 902, survey workflow module 104 may receive a survey request event. In some embodiments, the survey request event, which is a request that a survey be sent to a survey respondent, may be generated by one of the enterprise systems 116. For example, one of the enterprise systems 116 (e.g., sales system 116a) may generate the survey request event at various stages of its processing. In some embodiments, a user (e.g., an employee of the enterprise) may cause one of the enterprise systems 116 to generate the survey request event.

At 904, survey workflow module 104 can determine whether a survey is to be generated (or is not to be generated) for the survey request event. In some embodiments, survey workflow module 104 can make this determination based on the output (i.e., prediction) of survey request prediction module 106. For example, survey workflow module 104 can use survey request prediction module 106 to predict whether the survey request event will result in a survey. Survey workflow module 104 can generate a survey if the output (i.e., prediction) of survey request prediction module 106 is that the survey request event will result in a survey. Conversely, survey workflow module 104 does not generate a survey if the output (i.e., prediction) of survey request prediction module 106 is that the survey request event will not result in a survey.

If it is determined that a survey is not to be generated for the survey request event, then, at 906, survey workflow module 104 does not generate a survey. Otherwise, if it is determined that a survey is to be generated for the survey request event, then, at 908, survey workflow module 104 can generate a survey for the survey request event. In some embodiments, survey workflow module 104 can use survey systems 114 to conduct the survey.

At 910, survey workflow module 104 may optionally determine whether the survey (i.e., the survey generated for the survey request event) will result in a survey response. For example, survey workflow module 104 can use survey response prediction module 108 to predict whether the survey will result in a survey response.

At 912, survey workflow module 104 may optionally determine an estimated score for the survey (i.e., the survey generated for the survey request event). For example, survey workflow module 104 can use survey score estimation module 110 to predict an estimated score for the survey.

Figure 10:
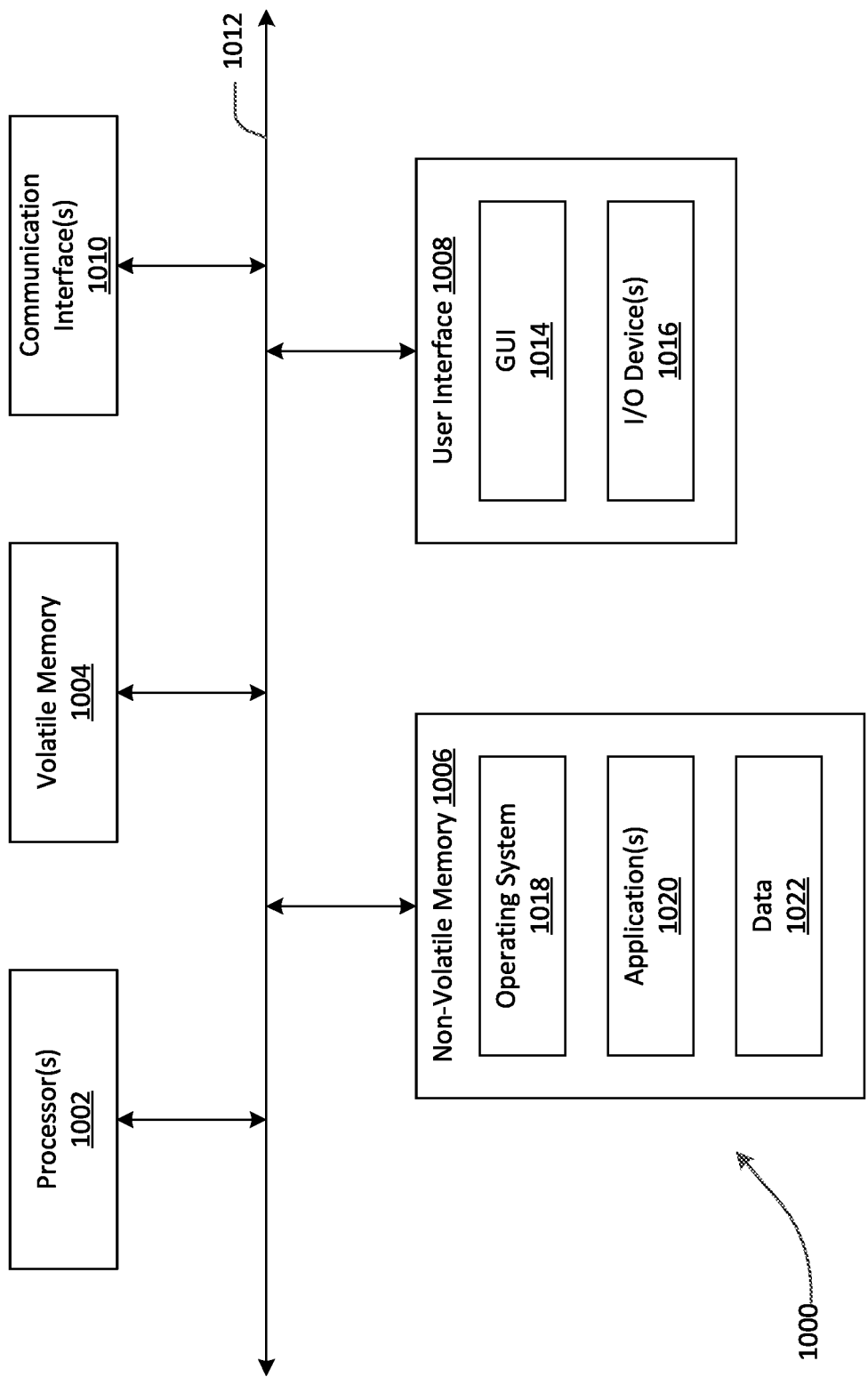
FIG. 10 is a block diagram illustrating selective components of an example computing device in which various aspects of the disclosure may be implemented, in accordance with an embodiment of the present disclosure.

FIG. 10 is a block diagram illustrating selective components of an example computing device 1000 in which various aspects of the disclosure may be implemented, in accordance with an embodiment of the present disclosure. As shown, computing device 1000 includes one or more processors 1002, a volatile memory 1004 (e.g., random access memory (RAM)), a non-volatile memory 1006, a user interface (UI) 1008, one or more communications interfaces 1010, and a communications bus 1012.

Non-volatile memory 1006 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

User interface 1008 may include a graphical user interface (GUI) 1014 (e.g., a touchscreen, a display, etc.) and one or more input/output (I/O) devices 1016 (e.g., a mouse, a keyboard, a microphone, one or more speakers, one or more cameras, one or more biometric scanners, one or more environmental sensors, and one or more accelerometers, etc.).

Non-volatile memory 1006 stores an operating system 1018, one or more applications 1020, and data 1022 such that, for example, computer instructions of operating system 1018 and/or applications 1020 are executed by processor(s) 1002 out of volatile memory 1004. In one example, computer instructions of operating system 1018 and/or applications 1020 are executed by processor(s) 1002 out of volatile memory 1004 to perform all or part of the processes described herein (e.g., processes illustrated and described in reference to FIGS. 1 through 9). In some embodiments, volatile memory 1004 may include one or more types of RAM and/or a cache memory that may offer a faster response time than a main memory. Data may be entered using an input device of GUI 1014 or received from I/O device(s) 1016. Various elements of computing device 1000 may communicate via communications bus 1012.

The illustrated computing device 1000 is shown merely as an illustrative client device or server and may be implemented by any computing or processing environment with any type of machine or set of machines that may have suitable hardware and/or software capable of operating as described herein.

Processor(s) 1002 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

Processor 1002 may be analog, digital or mixed signal. In some embodiments, processor 1002 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

Communications interfaces 1010 may include one or more interfaces to enable computing device 1000 to access a computer network such as a Local Area Network (LAN), a Wide Area Network (WAN), a Personal Area Network (PAN), or the Internet through a variety of wired and/or wireless connections, including cellular connections.

In described embodiments, computing device 1000 may execute an application on behalf of a user of a client device. For example, computing device 1000 may execute one or more virtual machines managed by a hypervisor. Each virtual machine may provide an execution session within which applications execute on behalf of a user or a client device, such as a hosted desktop session. Computing device 1000 may also execute a terminal services session to provide a hosted desktop environment. Computing device 1000 may provide access to a remote computing environment including one or more applications, one or more desktop applications, and one or more desktop sessions in which one or more applications may execute.

In the foregoing detailed description, various features of embodiments are grouped together for the purpose of streamlining the disclosure. This method of disclosure is not to be interpreted as reflecting an intention that the claims require more features than are expressly recited. Rather, inventive aspects may lie in less than all features of each disclosed embodiment.

As will be further appreciated in light of this disclosure, with respect to the processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

Elements of different embodiments described herein may be combined to form other embodiments not specifically set forth above. Other embodiments not specifically described herein are also within the scope of the following claims.

Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the words "exemplary" and "illustrative" are used herein to mean serving as an example, instance, or illustration. Any aspect or design described herein as "exemplary" or "illustrative" is not necessarily to be construed as preferred or advantageous over other aspects or designs. Rather, use of the words "exemplary" and "illustrative" is intended to present concepts in a concrete fashion.

In the description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical examples to aid the reader in understanding the present disclosure, and are to be construed as being without limitation to such specifically recited examples and conditions. Although illustrative embodiments of the present disclosure have been described in detail, various changes, substitutions, and alterations could be made hereto without departing from the scope of the present disclosure. Accordingly, it is intended that the scope of the present disclosure be limited not by this detailed description, but rather by the claims appended hereto.

What is claimed is:

1. A computer implemented method to predict whether a survey request event will result in a survey, the method comprising:

extracting, by a survey processing system, a plurality of features from historical survey request event-survey data, the plurality of features indicating a source of the survey request event, a type of survey request event, whether the survey requested by the survey request event is an internal survey or an external survey, and whether the survey requested by the survey request event will or will not result in a survey, wherein the plurality of features influence a prediction of whether to generate a survey;

generating, by the survey processing system, a training dataset comprising a plurality of training samples, each training sample of the plurality of training samples comprising the plurality of features extracted from the historical survey request event-survey data;

training, by the survey processing system, a first machine learning (ML) model to predict whether to generate a survey for a survey request event using the training dataset, wherein training the first ML model includes inputting the plurality of training samples to the first ML model;

receiving, by the survey processing system, a survey request event for which a survey is requested, the survey request event being generated by an enterprise system; and responsive to receiving the survey request event:
generating, by the survey processing system, a first feature vector for the survey request event, wherein the first feature vector comprises features extracted from the survey request event;
predicting, by the survey processing system using the first ML model, whether the survey request event will result in a survey based on the first feature vector;
responsive to a prediction that the survey request event will result in a survey, generating, by the survey processing system, a survey for the survey request event; and
responsive to a prediction that the survey request event will not result in a survey, not generating, by the survey processing system, a survey for the survey request event.

2. The method of claim 1, wherein the first ML model includes a dense neural network (DNN).

3. The method of claim 1, further comprising, responsive to generating the survey for the survey request event:
generating, by the survey processing system, a second feature vector for the generated survey, wherein the second feature vector comprises features extracted from the generated survey; and
predicting, by the survey processing system using a second ML model, whether the generated survey will result in a survey response based on the second feature vector, wherein the second ML model is trained using a training dataset generated from a corpus of historical survey and survey response data.

4. The method of claim 3, wherein the second ML model includes a classification model.

5. The method of claim 1, further comprising, responsive to generating the survey for the survey request event:

generating, by the survey processing system, a third feature vector for the generated survey, wherein the third feature vector comprises features extracted from the generated survey; and
predicting, by the survey processing system using a third ML model, an estimated score for the generated survey based on the third feature vector, wherein the third ML model is trained using a training dataset generated from a corpus of historical survey and survey response score data.

6. The method of claim 5, wherein the third ML model includes a regression model.

7. A system comprising:
one or more non-transitory machine-readable mediums configured to store instructions; and
one or more processors configured to execute the instructions stored on the one or more non-transitory machine-readable mediums, wherein execution of the instructions causes the one or more processors to:
extract a plurality of features from historical survey request event-survey data, the plurality of features indicating a source of the survey request event, a type of survey request event, and whether the survey requested by the survey request event is an internal survey or an external survey, and whether the survey requested by the survey request event will or will not result in a survey, wherein the plurality of features influence a prediction of whether to generate a survey;
generate a training dataset comprising a plurality of training samples, each training sample of the plurality of training samples comprising the plurality of features extracted from historical survey request event-survey data;
train a first machine learning (ML) model to predict whether to generate a survey for a survey request event using the training dataset, wherein training the first ML model includes inputting the plurality of training samples to the first ML model;
receive a survey request event for which a survey is requested, the survey request event being generated by an enterprise system; and
responsive to receipt of the survey request event:
generate a first feature vector for the survey request event, wherein the first feature vector comprises features extracted from the survey request event;
predict, using the first ML model, whether the survey request event will result in a survey based on the first feature vector;
responsive to a prediction that the survey request event will result in a survey, generate a survey for the survey request event; and
responsive to a prediction that the survey request event will not result in a survey, not generate a survey for the survey request event.

8. The system of claim 7, wherein the first ML model includes a dense neural network (DNN).

9. The system of claim 7, wherein execution of the instructions further causes the one or more processors to, responsive to the survey being generated for the survey request event:
generate a second feature vector for the generated survey, wherein the second feature vector comprises features extracted from the generated survey; and
predict, using a second ML model, whether the generated survey will result in a survey response based on the second feature vector, wherein the second ML model is trained using a training dataset generated from a corpus of historical survey and survey response data.

10. The system of claim 9, wherein the second ML model includes a classification model.

11. The system of claim 7, wherein execution of the instructions further causes the one or more processors to, responsive to the survey being generated for the survey request event:
- generate a third feature vector for the generated survey, wherein the third feature vector comprises features extracted from the generated survey; and
- predict, using a third ML model, an estimated score for the generated survey based on the third feature vector, wherein the third ML model is trained using a training dataset generated from a corpus of historical survey and survey response score data.

12. The system of claim 11, wherein the third ML model includes a regression model.

13. A non-transitory, computer-readable storage medium has encoded thereon instructions that, when executed by one or more processors, causes a process to be carried out, the process comprising:
- extracting, by a survey processing system, a plurality of features from historical survey request event-survey data, the plurality of features indicating a source of the survey request event, a type of survey request event, whether the survey requested by the survey request event is an internal survey or an external survey, and whether the survey requested by the survey request event will or will not result in a survey, wherein the plurality of features influence a prediction of whether to generate a survey;
- generating, a training dataset comprising a plurality of training samples, each training sample of the plurality of training samples comprising the plurality of features extracted from the historical survey request event-survey data;
- training a first machine learning (ML) model to predict whether to generate a survey for a survey request event using the training dataset, wherein training the first ML model includes inputting the plurality of training samples to the first ML model;
- receiving a survey request event for which a survey is requested, the survey request event being generated by an enterprise system; and
- responsive to receiving the survey request event:
  - generating, by the survey processing system, a first feature vector for the survey request event, wherein the first feature vector comprises features extracted from the survey request event;
  - predicting, by the survey processing system using the first ML model, whether the survey request event will result in a survey based on the first feature vector;
  - responsive to a prediction that the survey request event will result in a survey, generating, by the survey processing system, a survey for the survey request event; and
  - responsive to a prediction that the survey request event will not result in a survey, not generating, by the survey processing system, a survey for the survey request event.

14. The storage medium of claim 13, wherein the process further comprises, responsive to generating the survey for the survey request event:
- generating a second feature vector for the generated survey, wherein the second feature vector comprises features extracted from the generated survey; and
- predicting, using a second ML model, whether the generated survey will result in a survey response based on the second feature vector, wherein the second ML model is trained using a training dataset generated from a corpus of historical survey and survey response data.

15. The storage medium of claim 13, wherein the process further comprises, responsive to generating the survey for the survey request event:
- generating a third feature vector for the generated survey, wherein the third feature vector comprises features extracted from the generated survey; and
- predicting, using a third ML model, an estimated score for the generated survey based on the third feature vector, wherein the third ML model is trained using a training dataset generated from a corpus of historical survey and survey response score data.

* * * * *